US012623531B2

(12) United States Patent (10) Patent No.: US 12,623,531 B2
Oszwald et al. (45) Date of Patent: May 12, 2026

(54) INTERNAL REINFORCEMENT ELEMENT FOR A TANK MADE OF PLASTIC FOR A MOTOR VEHICLE

(71) Applicant: Plastic Omnium Advanced Innovation and Research, Brussels (BE)

(72) Inventors: Pierre Oszwald, Brussels (BE); Thomas Peret, Brussels (BE); Dominique Madoux, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/867,981

(22) PCT Filed: May 31, 2023

(86) PCT No.: PCT/EP2023/064490
§ 371 (c)(1),
(2) Date: Nov. 21, 2024

(87) PCT Pub. No.: WO2023/232841
PCT Pub. Date: Dec. 7, 2023

(65) Prior Publication Data
US 2025/0256564 A1     Aug. 14, 2025

(30) Foreign Application Priority Data
Jun. 1, 2022     (BE) .................................. 2022/5423

(51) Int. Cl.
*F17C 1/08*      (2006.01)
*B60K 15/03*      (2006.01)
(52) U.S. Cl.
CPC .... *B60K 15/03* (2013.01); *B60K 2015/03032* (2013.01); *B60K 2015/0346* (2013.01); *B60K 2015/03493* (2013.01)

(58) Field of Classification Search
CPC .......... B60K 2015/03493; B60K 2015/03032; F17C 2203/013; F17C 2203/011; F17C 1/08
See application file for complete search history.

(56) References Cited

U.S. PATENT DOCUMENTS

2016/0001651 A1* 1/2016 Gebert ............. B60K 15/03177
220/4.13
2016/0243930 A1* 8/2016 Criel ................ B60K 15/03177
(Continued)

FOREIGN PATENT DOCUMENTS

EP          3 790 755 A1     3/2021
EP          3 878 676 A2     9/2021

OTHER PUBLICATIONS

Korean Office Action issued Dec. 23, 2024, in corresponding Korean Patent Application No. 10-2024-7040767 (with English Translation), 13 pages.

(Continued)

*Primary Examiner* — Stephen J Castellano
(74) *Attorney, Agent, or Firm* — Oblon, McClelland, Maier & Neustadt, L.L.P.

(57)                ABSTRACT
An internal reinforcing element for a plastic tank for a motor vehicle is made as a single piece and includes: a central portion which in cross section is in the shape of an annulus sector, defining a main axis of the reinforcing element and having a first surface area, the central portion including a network of ribs extending radially in relation to the main axis, referred to as network of radial ribs; and two axial end portions which are situated one on each side of the central portion when considering the main axis, each of the axial end portions having an end surface of curved and oblong shape inscribed inside the cross section of the central portion and having a second surface area smaller than the first surface area.

10 Claims, 2 Drawing Sheets

(56)             References Cited

U.S. PATENT DOCUMENTS

| | | |
|---|---|---|
| 2018/0154769 A1 | 6/2018 | Lee et al. |
| 2018/0311880 A1 | 11/2018 | Sun et al. |
| 2021/0237558 A1* | 8/2021 | Liu ........................ B60K 15/03 |

OTHER PUBLICATIONS

International Search Report issued Aug. 25, 2023 in PCT/EP2023/064490, filed on May 31, 2023, 2 pages.

* cited by examiner

INTERNAL REINFORCEMENT ELEMENT FOR A TANK MADE OF PLASTIC FOR A MOTOR VEHICLE

BACKGROUND OF THE INVENTION

Field of the Invention

The invention relates to an internal reinforcement element for a tank made of plastic for a motor vehicle. It also relates to a plastic tank for a motor vehicle comprising an internal reinforcing element and a method of manufacturing a plastic tank for a motor vehicle.

Description of the Related Art

Traditionally, motor vehicle fuel tanks are designed to hold a quantity of fuel at a pressure almost identical to atmospheric pressure. With the advent of hybrid vehicles, also known as HEV (Hybrid Electric Vehicle), MHEV (Mild-Hybrid Electric Vehicle) or PHEV (Plug-in Hybrid Electric Vehicle), in other words motor vehicles comprising an internal combustion engine and one or more electric motors, which can potentially run for several months without using the internal combustion engine, it is preferable to maintain pressure in the fuel tank to reduce the passage of fuel vapors through an activated carbon filter, also known as a canister. This is achieved by isolating the canister from the tank using a valve such as a Fuel Tank Isolation Valve (FTIV).

Plastic fuel tanks of this type are therefore subject to dimensional variations over their lifetime. This occurs initially as soon as they exit the mold as a result of cooling thereof which is accompanied by shrinkage of the material, said plastic tanks being obtained by extrusion blow-molding a parison, or during use thereof as a result in particular of positive or negative pressure of their contents, or as a result of thermal expansion thereof over their life, or due to the temperature variation caused by the day/night cycle, or as a result of aging.

Typically, plastic fuel tanks for motor vehicles, more particularly plastic fuel tanks for hybrid motor vehicles, comprise an internal reinforcing element in the form of a pillar joining two opposing internal surfaces of the tank. Such a pillar must withstand various tests, such as long-term aging or a handling drop from a height of 1 meter, without degrading the properties of the fuel tank. For example, document WO2012/139962 A1 discloses an hourglass-shaped circular pillar that is highly resistant to axial stresses due to tension/compression phenomena, as well as to aging and strength tests. However, such a pillar is relatively sensitive to stresses caused by bending and/or torsion.

BRIEF SUMMARY OF THE INVENTION

The invention aims in particular to overcome these disadvantages of the prior art. More precisely, one of the objectives of the invention is to provide a reinforcing element for a plastic tank for a motor vehicle that can withstand not only axial stresses due to tension/compression phenomena, but also bending and torsion phenomena, said internal reinforcing element being easily obtained by injection molding.

To this end, the invention has as its object an internal reinforcing element for a plastic tank for a motor vehicle, made as a single piece and comprising:

a central portion which in cross-section has the shape of an annulus sector, defining a main axis of the reinforcing element and having a first surface area, the main axis passing through the center of rotation of the annulus sector perpendicular to the annulus sector, the central portion comprising a network of ribs extending radially in relation to the main axis, referred to as a network of radial ribs, and two axial end portions which are situated one on each side of the central portion when considering the main axis, each of the axial end portions having an end surface of curved and oblong shape inscribed inside the cross section of the central portion and having a second surface area smaller than the first surface area.

The curved shape of the central portion and its ribbed structure make it possible to better distribute the stresses transmitted to the internal reinforcing element in different directions, as demonstrated by finite element analyses carried out by the inventors. It is understood that such an internal reinforcing element resists bending and torsion phenomena better than the prior art pillar characterized by its structure that can be described as unidirectional.

What's more, the curved shape of the internal reinforcing element allows it to better overcome the constraints associated with its positioning in the tank. For example, the concave part of the internal reinforcing element can be used to surround an accessory provided in the tank, so that the volume of this concave part is not entirely lost. This type of arrangement is not possible with the prior art pillar.

Simulation tests have also shown that if the end surfaces are not oblong, i.e. if they have protruding corners, then stress is concentrated at these corners, forming a zone of brittleness in the internal reinforcing element. The inventors have found that replacing these protruding corners with rounded edges, thus forming the oblong shape, results in a better distribution of stresses over the entire internal reinforcing element, without the stresses being concentrated on these rounded edges. Simulation tests such as these have also shown similar results thanks to the cross-sectional narrowing in the transition from the central to the axial end portions.

Advantageously, the internal reinforcing element is made entirely of high-density polyethylene (HDPE) or high-density polyethylene reinforced with glass fibers.

The internal reinforcing element is thus made from a low-cost material that is easy to inject and weld. High-density polyethylene can be reinforced with glass fibers, for example up to 10% by weight, to further improve the mechanical properties of the internal reinforcing element.

Advantageously, the end surfaces each comprise a network of axial protuberances.

The axial protuberances make it easier to weld the internal reinforcement to the tank walls. In particular, they make it possible to weld without preheating.

Preferably, the end surfaces each comprise an openwork assembly of axial ribs surrounding the network of axial protuberances.

The axial ribs, which are also intended to be welded to the tank walls, improve the weld strength of the internal reinforcing element to the tank walls by allowing air to escape during welding. In other words, the axial ribs prevent air from being trapped between the axial end surfaces and the tank walls, which would weaken the connection between the internal reinforcing element and the tank.

Advantageously, the network of radial ribs comprises straight ribs extending perpendicularly or parallel to the main axis, defining between them recesses of generally rectangular parallelepiped shape, and cylindrical ribs, defining between them recesses of generally cylindrical shape.

The network of radial ribs thus forms a network of blind holes in the central portion of the internal reinforcing element, giving the central portion an overall waffle shape. Such a network improves the stiffness of the internal reinforcing element. In addition, the network of radial ribs gives the internal reinforcing element an anti-noise effect, similar to the acoustic properties of egg cartons.

Advantageously, the radial ribs form an asymmetrical network.

In this way, the network of radial ribs is given an error-proofing function, also referred to by the Japanese terms "poka yoke", meaning "unintentional error" and "prevent" respectively, making it possible to impose a particular position and orientation of the internal reinforcing element in the tank and thus reduce the scrap rate in the manufacture of plastic tanks for motor vehicles by preventing errors in the assembly of the internal reinforcing element in the tank.

Advantageously, the internal reinforcing element comprises gripping means located on a side wall of the central portion.

This provides the internal reinforcing element with the means to adapt to different molding techniques, helping to make the invention simple to implement.

Advantageously, the end surfaces have a shape corresponding to a homothety of the annulus sector with a ratio k less than or equal to 1, in which each of its four corners is replaced by a rounded edge. In other words, the end surfaces have a annulus sector shape, extending over an angular sector and a radius corresponding respectively to the angular sector and the radius of the annulus sector of the central portion multiplied by the ratio k less than 1, whose four corners are replaced by rounded edges.

The end surfaces are not only simple to produce, but also have a shape close to that of the cross-section of the central portion. This ensures that the geometric transition between the central portion and the end portions is not shaped in such a way as to concentrate stresses that could weaken the internal reinforcing element.

According to a particular embodiment of the invention, the annulus sector shape of the straight section of the central portion has an infinite radius, and the oblong, curved shape of the end surface of each of the axial end portions also has an infinite radius. In other words, the reinforcing element is straight rather than curved.

Although a straight reinforcing element does not offer as many advantages as a curved reinforcing element, a straight reinforcing element does benefit from the aforementioned advantages associated with the oblong shape and cross-sectional narrowing in the transition from the central portion to the axial end portions.

Also provided according to the invention is a plastic tank for a motor vehicle comprising an internal reinforcing element as defined above.

The invention also provides a method for manufacturing a plastic tank for a motor vehicle, in which an internal reinforcing element as defined above is welded to two opposing inner walls of the tank.

BRIEF DESCRIPTION OF THE FIGURES

The invention will be better understood upon reading the following description, which is provided merely as example and with reference to the appended drawings, wherein:

4

Figure 1:
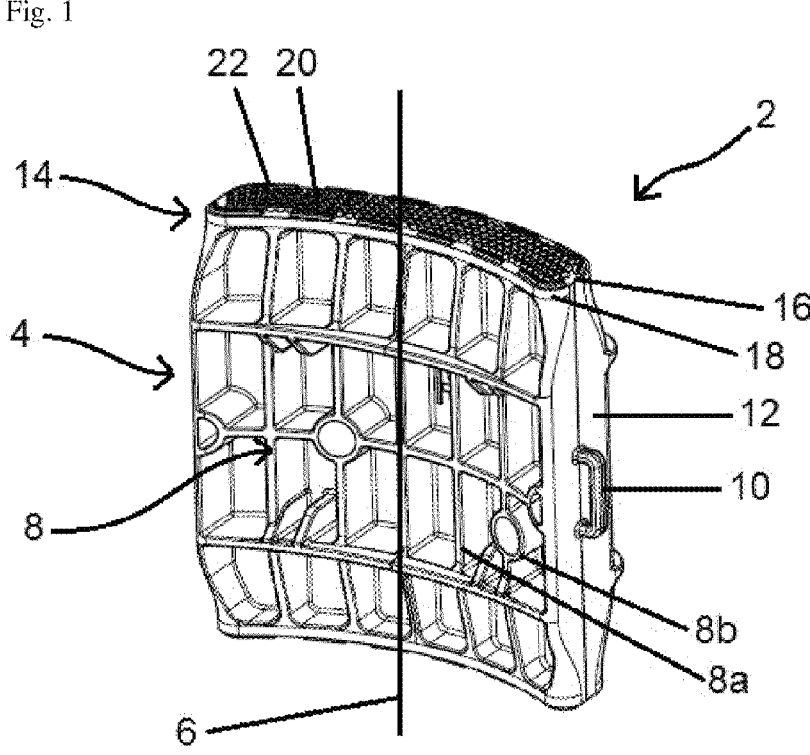
Figure 2:
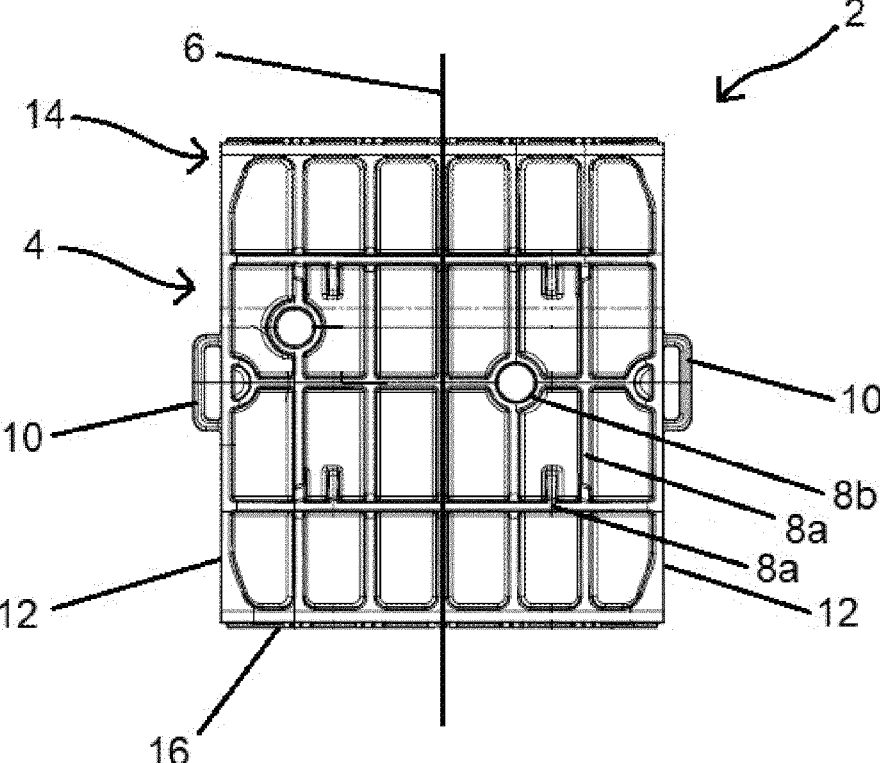
Figure 3:
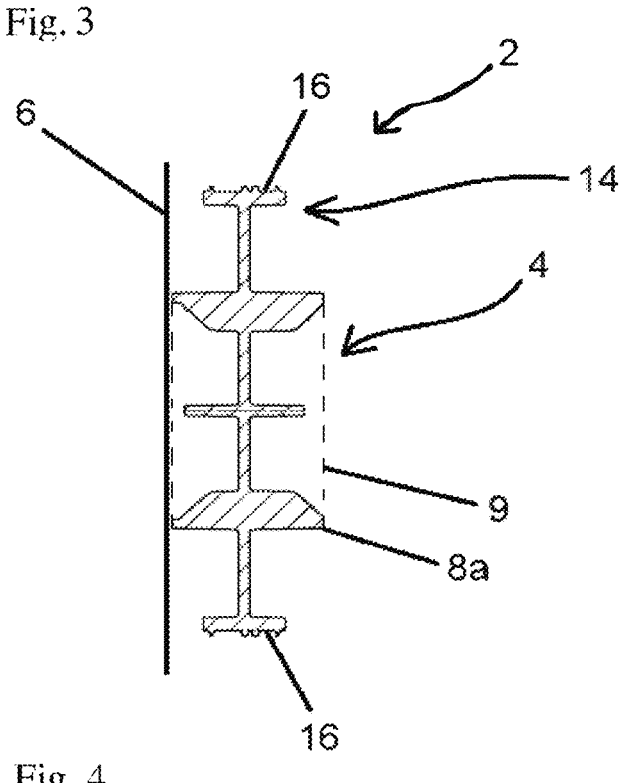
Figure 4:
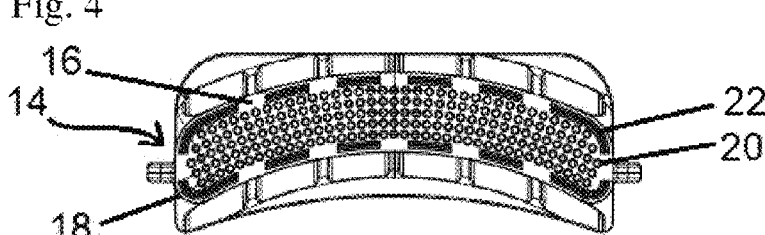
Figure 5:
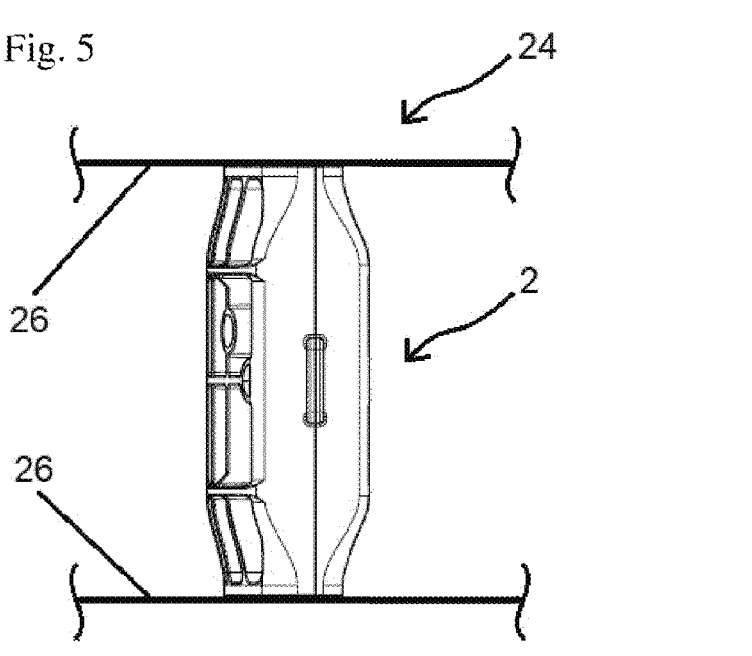

FIG. 1 is a perspective view of an internal reinforcing element for a plastic tank according to one embodiment of the invention, FIG. 2 is a front view of the internal reinforcing element of FIG. 1, FIG. 3 is a cross-sectional view of the internal reinforcing element of FIG. 1, FIG. 4 is a top view of the internal reinforcing element of FIG. 1, and FIG. 5 is a schematic view of a plastic tank for a motor vehicle according to the invention, comprising the internal reinforcing element of FIG. 1.

DETAILED DESCRIPTION OF THE INVENTION

FIG. 1 shows an internal reinforcing element 2 for a plastic tank for a motor vehicle, according to one embodiment of the invention. The internal reinforcing element 2 is made as a single piece and entirely from a material suitable for welding to the walls of a plastic tank. The internal reinforcing element 2 is made entirely of high-density polyethylene (HDPE) or high-density polyethylene reinforced with glass fibers.

The reinforcing element 2 comprises a central portion 4 having a cross-section in the shape of an annulus sector with respect to a main axis 6 defining an axial direction or orientation of the reinforcing element 2. The main axis 6 is defined as the axis passing through the center of rotation of the annulus sector, perpendicular to the annulus sector. This is the axis of rotation of the annulus sector. The main axis 6 therefore extends outside the annulus sector and the internal reinforcing element 2. For clarity of the figures, the main axis 6 is represented by means of axes extending into the internal reinforcing element 2 or at its surface, since the main property of the main axis 6 according to the invention is its direction and not its position. In other words, the axes marked with the numerical reference "6" on the figures correspond to axes parallel to the main axis and identify the axial direction. As best illustrated in the front view of the internal reinforcing element 2 shown in FIG. 2, the central portion 4 comprises a network of ribs extending radially with respect to the main axis 6, known as the network of radial ribs 8.

The network of radial ribs 8 comprises straight ribs 8a which extend perpendicularly or parallel to the main axis 6 and define between them recesses, or blind holes, generally in the shape of a rectangular parallelepiped. The network of radial ribs 8 also includes cylindrical ribs 8b which define generally cylindrical recesses, or blind holes, between them. The straight ribs 8a contribute to the mechanical properties of the internal reinforcing element 2, in particular by improving its resistance to bending and torsion. The radial ribs 8b also help to reinforce the mechanical properties of the internal reinforcing element 2, but this is not their only function. The radial ribs 8b form an asymmetrical network for error-proofing In other words, the position of the radial ribs 8b enables an operator to correctly position and orient the internal reinforcing element 2 for installation in a tank, so that it is not mounted upside-down or backwards, which could prevent it from optimally performing its reinforcement functions. Here in FIG. 2, it can be seen that the central portion 4 of the internal reinforcing element 2 comprises a radial rib 8b positioned on the equator of the central portion 4 and another radial rib 8b positioned at a distance from the equator. This second radial rib allows the operator to correctly orient the internal reinforcing element 2 in a tank.

FIG. 3 shows a cross-sectional view of the internal reinforcing element 2, showing the annulus sector shape of the central portion 4. To show this, the blind holes defined by the network of radial ribs 8 have been depicted as filled to obtain a solid surface, as shown by the dashed lines 9 in [FIG. 3]. The cross-section of the central portion 4, considered in a plane perpendicular to the main axis 6, has a first surface area $a_1$.

Returning to [FIG. 2], the internal reinforcing element 2 comprises gripping means 10 located on a side wall 12 of the central portion 4. In this embodiment of the invention, the central portion 4 of the reinforcing element 2 comprises two opposing side walls 12, each comprising gripping means 10. Each of these gripping means 10 takes the form of a straight handle connected at two points to the corresponding side wall 12. The shape of these gripping means 10 can be compared to that of a briefcase handle. The gripping means 10 facilitate the integration of the internal reinforcing element 2 during the manufacture of the plastic tank, particularly when the latter is produced by blow-molding using a technique for inserting the internal reinforcing element into the parison.

The internal reinforcing element 2 comprises two axial end portions 14 located on either side of the central portion 4 with respect to the main axis 6. As best shown in [FIG. 4], which is a top view of the internal reinforcing element 2, each of the axial end portions 14 has an oblong, curved end surface 16, inscribed in the cross-section of the central portion 4, having a second area $a_2$ less than the first surface area $a_1$. Here, the end surfaces 16 have a shape corresponding to a homothety of the annulus sector of the central portion with a ratio k less than or equal to 1, in which each of its four corners is replaced by a rounded edge 18. Preferably, the ratio k is chosen to be greater than 0.5, or greater than 0.8, or even greater than 0.9. According to an equivalent definition, the end surfaces 16 have a annulus sector shape, extending over an angular sector and a radius corresponding respectively to the angular sector and the radius of the annulus sector of the central portion multiplied by the ratio k less than 1, whose four corners are replaced by rounded edges 18. The end surfaces 16 are designed to be welded to two opposite walls of a plastic tank.

Each end surface 16 comprises a network of axial protuberances 20 extending parallel to the main axis 6 over a length of between 1 and 2 mm. The axial protuberances 20 are here arranged in radial rows and occupy a majority of the area of the end surface 16. Each end surface 16 further comprises an openwork assembly of axial ribs 22 surrounding the network of axial protuberances 20. This means that the axial ribs 22 define a contour in which all the axial protuberances 20 are inscribed. The axial ribs 22 are arranged in openwork fashion, i.e. spaced apart, to allow air to escape when the end surfaces 16 are welded to the walls of a tank.

The reinforcing element 2 is manufactured by injection molding. Thanks to its geometry, and in particular that of the network of radial ribs 8, the molding can be carried out easily in a single operation.

A plastic tank 24 according to the invention is shown in [FIG. 5]. The tank 24 comprises the internal reinforcing element 2, which is welded to two opposing walls 26 of the tank 24. The internal reinforcing element 2 can be welded to the walls of the tank 26 by any suitable technique, during or after the molding of the tank 24. The gripping means 10 can be grasped by a holding member (not shown) to facilitate the welding of the reinforcing element 2 to the walls of the tank 26.

The invention is not limited to the embodiments presented, and other embodiments will become clearly apparent to the person skilled in the art.

LIST OF REFERENCES

2: internal reinforcing element
4: central portion
6: main axis
8: network of radial ribs
8*a*: straight rib
8*b*: cylindrical rib
9: broken line
10 gripping devices
12: side wall
14: axial end portion
16: end surface
18: rounded edge
20: network of axial protuberances
22: axial rib
24: tank
26: tank wall

The invention claimed is:

1. An internal reinforcing element for a plastic tank for a motor vehicle, made from a single piece and comprising:
a central portion which in cross-section has the shape of an annulus sector, defining a main axis of the reinforcing element and having a first surface area, the main axis passing through the center of rotation of the annulus sector perpendicular to the annulus sector, the central portion comprising a network of ribs extending radially in relation to the main axis, referred to as a network of radial ribs, and
two axial end portions which are situated one on each side of the central portion when considering the main axis, each of the axial end portions having an end surface of curved and oblong shape inscribed inside the cross section of the central portion and having a second surface area smaller than the first surface area,
wherein a cross-section of the internal reinforcing element along a plane parallel to the main axis of the radial rib tapers from the central portion to the axial end portions.

2. The reinforcing element according to claim 1, made entirely of high-density polyethylene (HDPE).

3. The reinforcing element according to claim 1, wherein the end surfaces each comprise a network of axial protuberances.

4. The reinforcing element according to claim 3, wherein the end surfaces each comprise an openwork assembly of axial ribs surrounding the network of axial protuberances.

5. The reinforcing element according to claim 1, wherein the network of radial ribs comprises straight ribs extending perpendicularly or parallel to the main axis, defining therebetween recesses of generally rectangular parallelepiped shape, and cylindrical ribs, defining therebetween recesses of generally cylindrical shape.

6. The reinforcing element according to claim 1, wherein the radial ribs form an asymmetrical network.

7. The reinforcing element according to claim 1, comprising gripping means located on a side wall of the central portion.

8. The reinforcing element according to claim 1, wherein the end surfaces have a shape corresponding to a homothety of the annulus sector with a ratio k less than or equal to 1, in which shape each of its four corners is replaced by a rounded edge.

9. A plastic tank for a motor vehicle comprising an internal reinforcing element according to claim 1.

10. A method for manufacturing a plastic tank for a motor vehicle, wherein an internal reinforcing element according to claim 1 is welded to two opposing internal walls of the tank.

\*  \*  \*  \*  \*